(No Model.)
J. G. BLOUNT.
SPEED CONTROLLING DEVICE.
No. 453,033. Patented May 26, 1891.
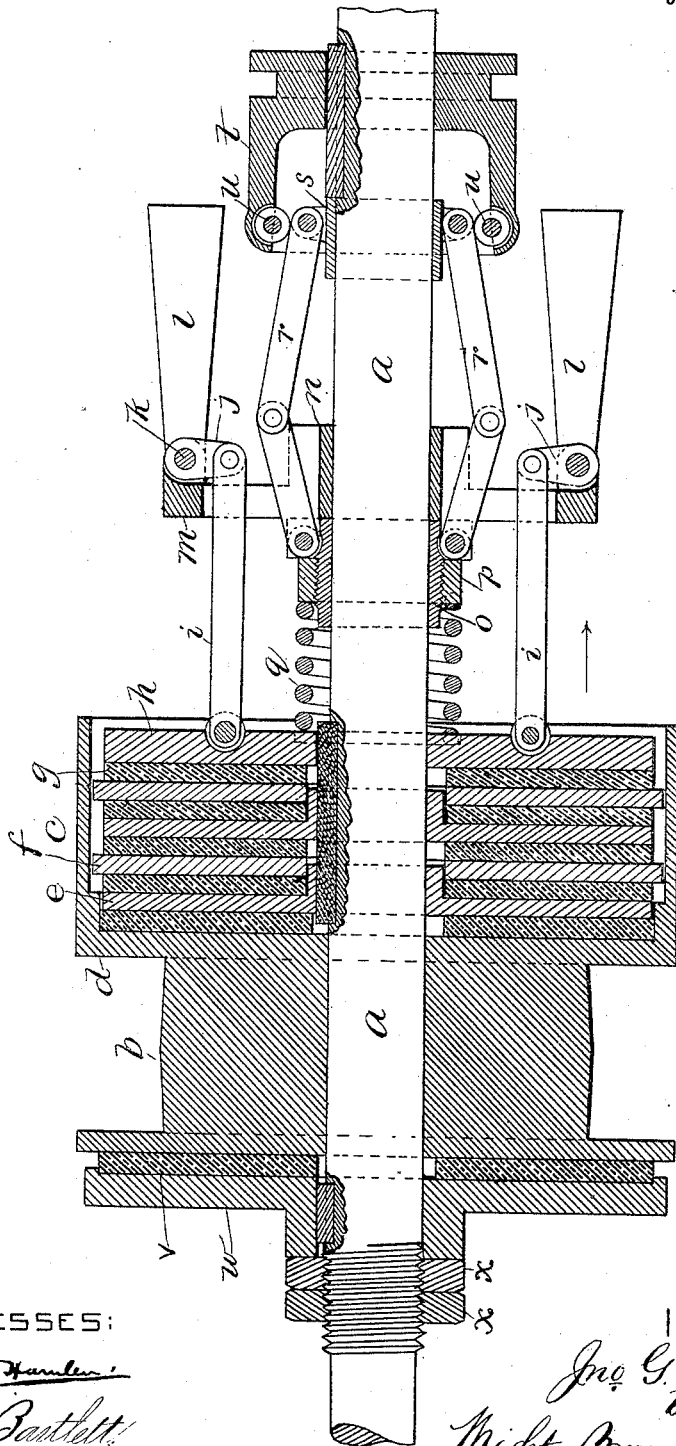
WITNESSES:
INVENTOR:
Jno. G. Blount.
by
Might, Brown & Crossley.
Attys.

UNITED STATES PATENT OFFICE.

JOHN G. BLOUNT, OF EVERETT, MASSACHUSETTS.

SPEED-CONTROLLING DEVICE.

SPECIFICATION forming part of Letters Patent No. 453,033, dated May 26, 1891.

Application filed August 13, 1890. Serial No. 361,930. (No model.)

*To all whom it may concern:*

Be it known that I, JOHN G. BLOUNT, of Everett, in the county of Middlesex and State of Massachusetts, have invented certain new and useful Improvements in Speed-Controlling Devices, of which the following is a specification.

My invention relates to that class of speed-controllers which are contrived to impart a uniform speed to the machine or device that it is designed to drive—such, for example, as dynamo-electric machines, looms, spinning-frames, printing-presses, &c.

It is the object of my invention to provide such improvements as will render the speed-controller readily adjustable to any rate of speed that it is desired to impart to the machine to be driven and to provide a friction device which shall be certain and efficient in its operation.

To these ends my invention consists in the improvements hereinafter described and claimed, reference being had to the annexed drawing, which shows a sectional elevation of my improvements applied to a shaft which may be supposed to be connected with the machine or device to be driven.

In the drawing, $a$ represents the driven shaft.

$b$ is the driving-pulley, adapted to turn on the shaft $a$ independently thereof or to be clutched or connected therewith and turn the latter by means of a friction mechanism to be presently described.

$c$ is an annular flange connected with the periphery of the rim $d$ of the driver $b$.

$e$ represents disks of iron arranged within the annular flange $c$ and splined upon or otherwise connected with the shaft $a$ and extending from said shaft to the inner walls of the annular flange $c$.

$f$ designates metallic disks similar to the disks $e$, but connected at their outer edges or peripheries with the flange $c$ of the driver and extending from thence inward to or nearly to the shaft $a$.

$g$ designates disks of leather or other suitable frictional material interposed between the metallic disks $e$ and $f$, so that the annular flange $c$ of the driver may contain alternate disks of metal and leather or other suitable non-metallic material, the metal disks being alternately connected with the shaft $a$ and flange $c$. This multiplication of frictional disks is for the purpose of enhancing the degree of friction between the driver $b$ and shaft $a$, as will more fully appear hereinafter.

$h$ is a metallic disk arranged to bear upon the friction-disks in the flanged hub of the driver $b$. To the outer face of the disk $h$ there are pivoted the inner ends of links or pitmen $i$, the outer ends of which are pivotally connected to the arm $j$ of a bell-crank lever fulcrumed upon a stud $k$, having bearings in ears or projections $m$ of a collar $n$, arranged to slide loosely on shaft $a$. The arms $l$ of the said bell-crank lever are weighted, and their outer ends are free to be moved outwardly by centrifugal or other force.

$r$ $r$ are toggle-levers pivoted at their inner ends upon the collar $o$, which rests against the collar $n$, with which it moves in contact. The outer ends of said toggle-levers are pivotally connected with a collar $s$, fixed to the shaft $a$.

$p$ is a collar screwed upon collar $o$ and bearing at its outer face upon the end of spring $q$ for the purpose of adjusting the tension with which the said spring may be caused to bear upon disk $h$ independently of the toggle-levers or collar $o$.

$t$ is a flange-collar longitudinally adjustable upon the shaft $a$ and provided on its forward face with rollers or bowls $u$, constructed and arranged to bear upon the toggle-levers $r$, so as to move the same and press the collar $o$ inward against spring $q$, causing the latter to bear with greater or less force against the disk $h$.

$v$ is a frictional disk interposed between the outer face of the driving-pulley $b$ and the inner face of a washer or disk $w$, splined on the shaft $a$, and maintained in place by means of the nuts $x$ $x$, screwed upon the shaft $a$.

In the operation of my invention the driver $b$ will always be rotated at a rate of speed in excess of that which it may be desired to have imparted to the driven shaft $a$, and the improvement is contrived to render the driver ineffective in its operation upon the shaft $a$ to a degree corresponding with such excessive rotation of the driver, it being the prime object of the invention to secure the operation of a machine at a uniform rate of speed. For example, if a loom adapted to effect a stated number of "picks" per minute, a dynamo-electric machine, a printing-press, and other machines were connected with the same source of power, and it should be desired to run each machine uniformly at its maximum rate of speed, the driver of each machine will always be speeded at a rate above that at which each of the machines is to be driven, and the invention will render the excessive movements of the driver and all variations in such excessive movements ineffective upon the driven machine.

To illustrate further, suppose that the driver $b$ should be operated at the rate of six hundred revolutions per minute and that it is desired that the shaft $a$, arranged to drive a dynamo-electric machine, should not be operated above five hundred revolutions per minute, and that this rate of speed of the said shaft should be maintained regardless of the "slowing down" or "speeding up" of the driver for any reason. The toggle-levers $r$ will be so adjusted as that the spring $q$ will hold the shaft $a$ frictionally connected with the driver until the speed of the said shaft exceeds five hundred revolutions per minute, when the centrifugal tendency imparted to the weighted ends of arms $l$ will be sufficient to carry the said ends of said arms outward, and through the medium of the links $i$ draw the disk $h$ forward, in the direction indicated by the arrow, against the stress of the spring $q$, and so overcome the frictional connection between the shaft $a$ and driver $b$ to a degree corresponding to the degree of centrifugal tendency imparted to the weighted arms $l$ by the rotation of the shaft above five hundred revolutions per minute. In other words, the centrifugal tendency imparted to the weighted arms $l$ will act, as it were, to take off from the shaft $a$ the number of revolutions of the driver $b$ in excess of five hundred revolutions per minute by causing the driver to slip on the shaft to an extent corresponding to the rate of operation of the driver above five hundred revolutions per minute. In this way I am enabled to drive such devices as dynamo-electric machines, looms, spinning-frames, printing-presses, &c., which it is desirable and oftentimes quite essential to perfect and profitable results to have operated at a uniform rate of speed.

My improvements are distinguishable from "speed-regulators" or "brakes," so called, which are contrived to brake or retard the operation of devices when there is a tendency to speed the latter above a predetermined degree. My invention does not effect a braking or retarding of any part or element that may be operated, but simply renders the excessive speed of the driver ineffective as a means for rotating the driven shaft.

In addition to the flanged collar $t$ I am enabled by means of the screw-threaded collar $p$ to adjust the tension or stress of the spring $q$ upon the disk $h$, so that the action of said spring upon the friction-disks may be regulated to great nicety.

It will be seen that by my improvements the wear upon the friction-disks will be automatically taken up by the action of the spring $q$ upon the disk $h$, since provision is made whereby as the leather disks wear away the metallic disks may be brought closely together and bear with the same stress or force upon the friction-disks as before any wear was occasioned thereon.

It is obvious that changes may be made in the form and arrangement of parts comprising my invention without departing from the nature or spirit thereof.

Having thus explained the nature of my invention and described a way of constructing and using the same, I declare that what I claim is—

1. The combination, with the shaft, of the driver adapted to turn independently thereon, a plurality of friction-disks, a spring $q$ for operating upon said friction-disks to connect a driver with the shaft, an adjustable collar $o$ on the shaft to regulate the stress or tension with which the spring may act upon said disks, and a centrifugally-operated device for overcoming the stress of the said spring upon the friction-disks to a predetermined extent, as set forth.

2. A speed-controller consisting of the driver $b$, provided with the flange $c$, a plurality of metallic disks in said flange, alternately connected with said driver and the shaft to be driven, non-metallic disks interposed between said metallic disks and between the latter and the driver, a spring to bear upon said disks and frictionally connect the driver with the shaft, a movable collar to cause the spring to act with tension upon the disks, the toggle-levers $r$ and movable collar $t$ to adjust the first-mentioned collar, and a centrifugally-operated device for overcoming the said spring and to a predetermined degree releasing the frictional connection of the driver with the shaft, as set forth.

In testimony whereof I have signed my name to this specification, in the presence of two subscribing witnesses, this 30th day of July, A. D. 1890.

JOHN G. BLOUNT.

Witnesses:
ARTHUR W. CROSSLEY,
EWING W. HAMLEN.